United States Patent
Marceau et al.

(10) Patent No.: US 7,249,747 B2
(45) Date of Patent: Jul. 31, 2007

(54) PORTABLE REST DEVICE FOR LAPTOP COMPUTER

(75) Inventors: Richard J. Marceau, Sherbrooke (CA); Réal Brousseau, Sherbrooke (CA); Jacques Hallée, Acsot (CA); Danielle Barrette, Rock Forest (CA); Martin Brouillette, Sherbrooke (CA)

(73) Assignee: University of Ontario Institute of Technology, Oshawa, Ontario (CA)

( * ) Notice: Subject to any disclaimer, the term of this patent is extended or adjusted under 35 U.S.C. 154(b) by 0 days.

(21) Appl. No.: 10/833,617

(22) Filed: Apr. 28, 2004

(65) Prior Publication Data

US 2004/0262485 A1    Dec. 30, 2004

Related U.S. Application Data

(60) Provisional application No. 60/466,402, filed on Apr. 30, 2003.

(51) Int. Cl.
*A47B 91/00*    (2006.01)

(52) U.S. Cl. .......................... 248/346.04; 248/346.07; 108/43

(58) Field of Classification Search ............ 248/346.4, 248/346.01, 346.02, 346.07; 108/43; 165/121, 165/80.3; 361/687, 683, 695
See application file for complete search history.

(56) References Cited

U.S. PATENT DOCUMENTS

| | | | | |
|---|---|---|---|---|
| 5,183,230 A | * | 2/1993 | Walker et al. | 248/118 |
| 5,349,899 A | * | 9/1994 | Tominaga et al. | 99/646 R |
| 5,871,094 A | * | 2/1999 | Leibowitz | 206/320 |
| 6,115,249 A | | 9/2000 | Cipolla et al. | 361/687 |
| 6,282,089 B1 | | 8/2001 | Nakanishi et al. | 361/687 |
| D449,048 S | | 10/2001 | Yu et al. | D14/439 |
| 6,390,181 B1 | * | 5/2002 | Hall et al. | 165/80.3 |
| 6,875,101 B1 | * | 4/2005 | Chien | 454/184 |
| 2002/0003197 A1 | | 1/2002 | MacEachern | 248/346.01 |

FOREIGN PATENT DOCUMENTS

EP    1176494 A1    1/2002

* cited by examiner

*Primary Examiner*—Ramon O Ramirez
(74) *Attorney, Agent, or Firm*—Harrington & Smith, PC

(57) ABSTRACT

A portable rest device for a laptop computer is made of a thermally-conductive material, and comprises a top face for receiving the laptop computer and a bottom heat-dissipating three-dimensional pattern. Due to this design, the portable rest device dissipates 1) the heat generated by the laptop computer and captured by the top face, and 2) the heat generated by the user when the bottom heat-dissipating three-dimensional pattern is disposed on the user's lap.

15 Claims, 10 Drawing Sheets

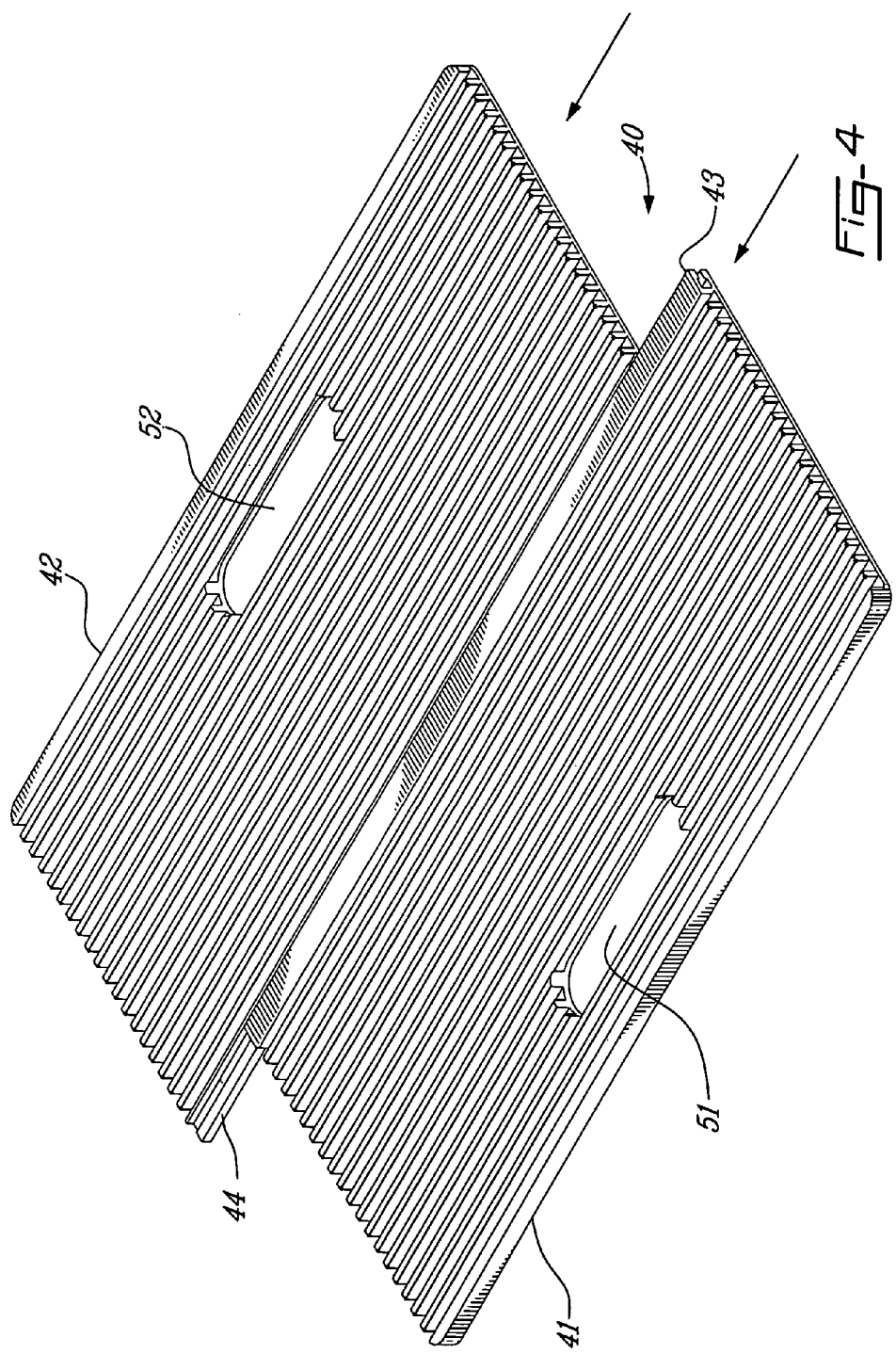

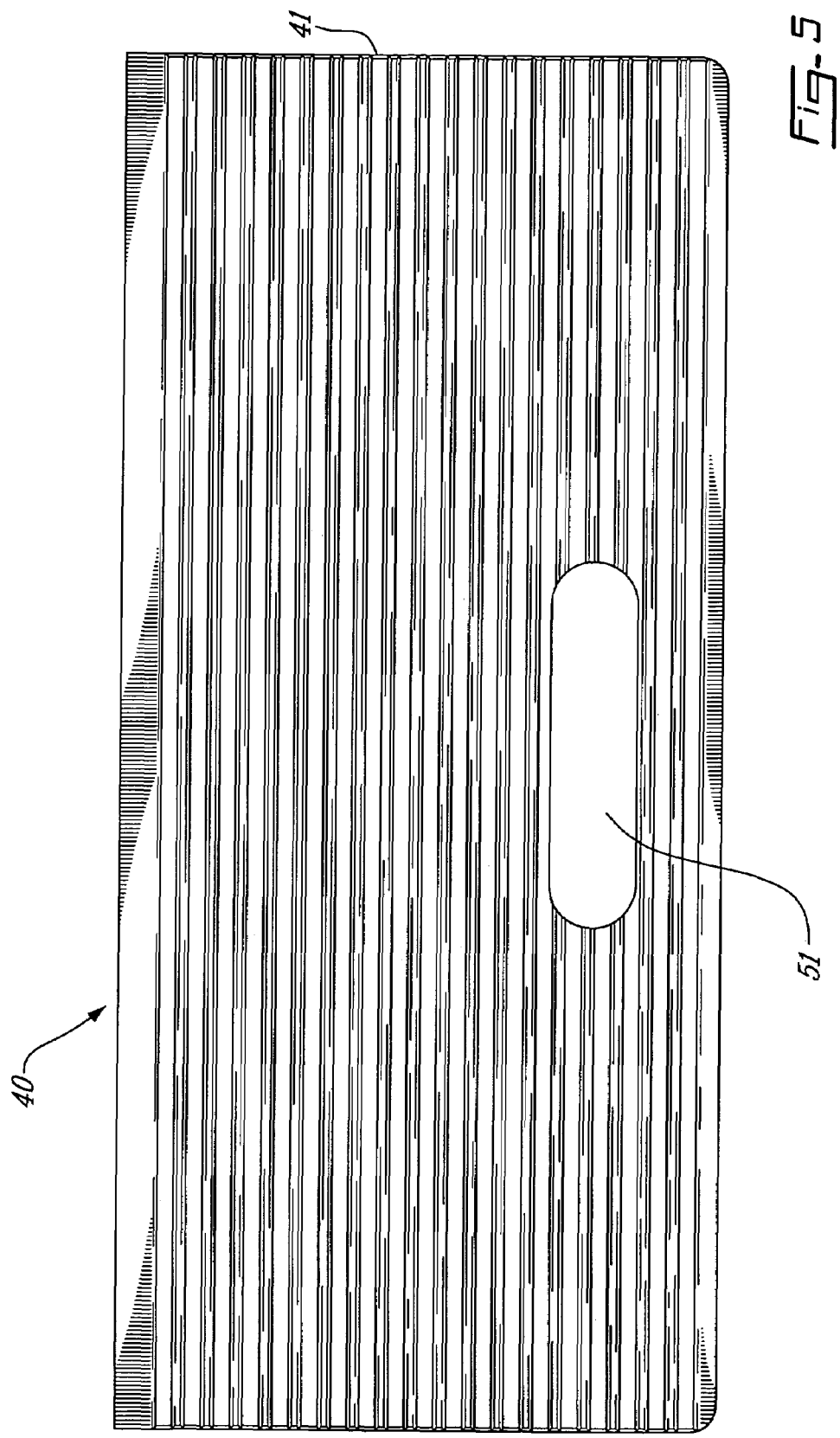

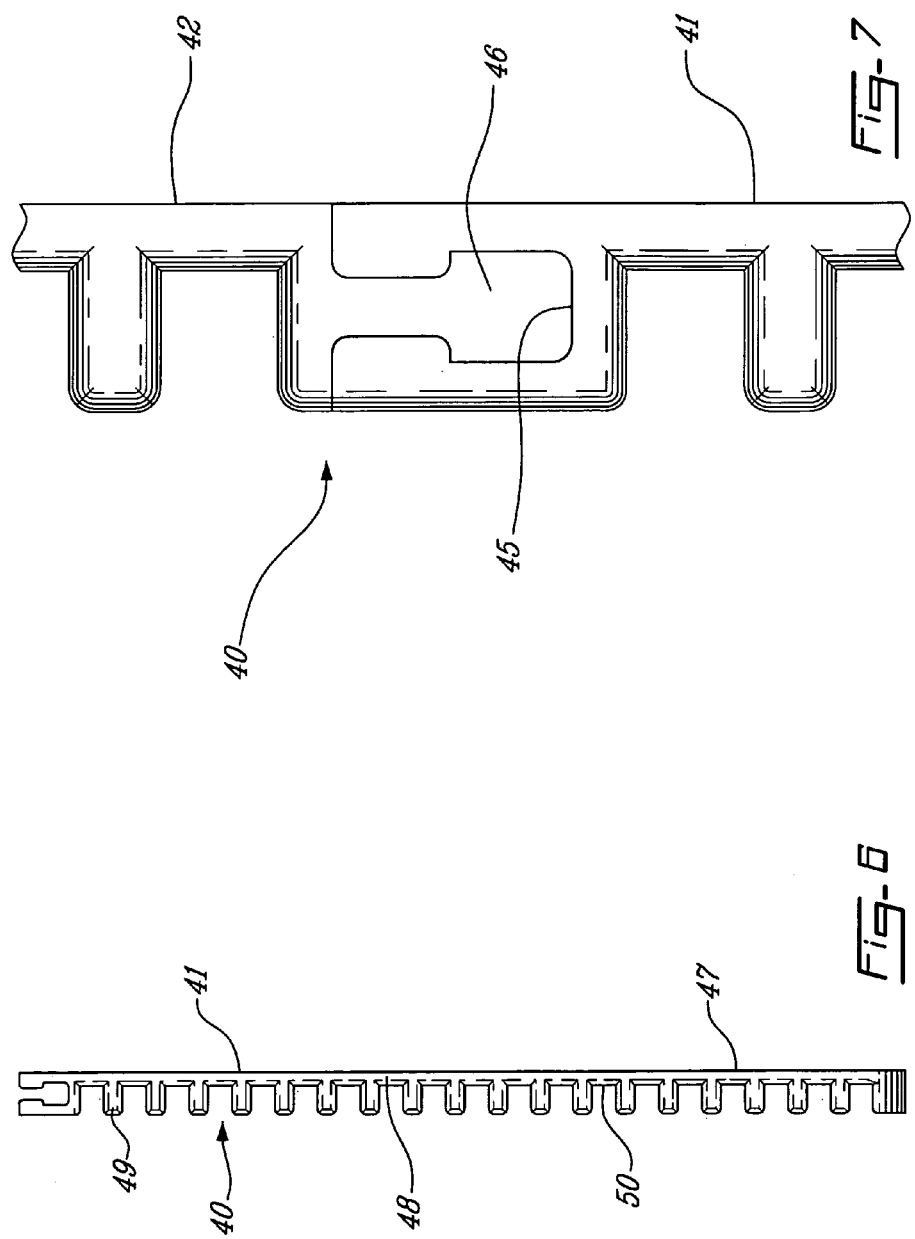

PORTABLE REST DEVICE FOR LAPTOP COMPUTER

CROSS REFERENCE TO RELATED APPLICATION

This application claims the benefit under 35 U.S.C. §119 (e) of U.S. Provisional Patent Application No. 60/466,402 filed Apr. 30, 2003.

BACKGROUND OF THE INVENTION

1. Field of the Invention

The present invention relates to the field of laptop computers. More particularly, the present invention is concerned with a portable rest device for use with a laptop computer.

2. Brief Description of the Current Technology

The use of laptop computers has become widespread in the past several years. When they first appeared on the market, their relative light weight and flexibility of use was offset by important disadvantages in terms of performance, screen size, robustness and cost in comparison with desktop computers. However, the technology has evolved to such a degree in recent years that their advantageous characteristics have become even more attractive and their disadvantages have been significantly overcome. Consequently, laptop computers are nearly commonplace.

The aforementioned advantages of laptop computers are such that many users make use of such computers in a very different environment than that found in most office buildings. Indeed, laptop computers are now frequently employed in situations whereby the user finds himself or herself in a comfortable chair without the use of a desk and where the laptop computer generally rests on the user's lap while the user is in a sitting position. Although such a position can be comfortable for a few minutes, an important impediment to maintaining such a position for a lengthy period of time is the discomfort which naturally arises from the use of laptop computers in such a position. Such discomfort is due to three factors:

1. A modern laptop computer generates a non-negligible amount of heat. When the bottom of the laptop computer is in direct contact with a user's thighs, this heat contributes to a higher than ambient operating temperature which consequently tends to transfer itself to the user by means of thermal conduction through the bottom part of the laptop computer to the user's thighs.
2. The bottom part of laptop computers is generally made of metal and/or plastic. Metal or plastic surfaces in direct contact with a user's lap, whether clothed or not, whether or not heat is generated by such surfaces, eventually lead to discomfort. The user's thighs tend to generate heat, which if not dissipated, leads to an increase in temperature, thereby causing perspiration, thereby contributing to user's discomfort.
3. A user, whether or not annoyed by increased temperatures due to non-dissipated heat, tends to spread apart or move toward each other his (her) thighs in a random fashion, thereby occasionally blocking ventilation ports of the laptop computer which should normally contribute to cooling down the laptop computer. Such behaviour therefore contributes to less efficient internal cooling of the laptop computer, higher internal operating temperatures and thereby contribute to increased user discomfort.

Consequently, there is a need for a portable rest device for a laptop computer which addresses these three problems and which thereby contributes to increase the user's comfort while using a laptop computer in a sitting position in the absence of a desk.

SUMMARY OF THE INVENTION

In accordance with the present invention, there is provided a portable rest device for a laptop computer made of thermally-conductive material, and comprising a top face for receiving the laptop computer and a bottom heat-dissipating three-dimensional pattern.

The present invention also relates to a portable rest plate for a laptop computer made of thermally-conductive material, and comprising a top face for receiving the laptop computer and a heat-dissipating three-dimensional bottom face.

The foregoing and other objects, advantages and features of the present invention will become more apparent upon reading of the following non restrictive description of illustrative embodiments thereof, given by way of example only with reference to the accompanying drawings.

BRIEF DESCRIPTION OF THE DRAWINGS

In the appended drawings:

FIG. 4 is a bottom perspective view of a second illustrative embodiment of portable rest plate for a laptop computer in accordance with the present invention, which consists of two plate sections that can be assembled together for use with a laptop computer or disassembled from each other for storage in, for example, a laptop computer carrying case;

FIG. 5 is a bottom plan view of one of the two plate portions of the second illustrative embodiment of portable rest plate for a laptop computer as shown in FIG. 4;

FIG. 6 is an end view of the plate portion of FIG. 5;

FIG. 7 is a cross sectional, enlarged view of a sliding mechanism for assembling the two plate portions of the second illustrative embodiment of portable rest plate for a laptop computer of FIGS. 4-6;

DETAILED DESCRIPTION OF THE ILLUSTRATIVE EMBODIMENTS

The first, second and third non-limitative, illustrative embodiments of the present invention will now be described in detail with reference to the accompanying drawings. In the different figures of the drawings, the same references are used to identify the same or similar elements of the portable rest plate for laptop computer.

The portable rest plate for a laptop computer according to the illustrative embodiments of the present invention present, amongst others, the following features:

the portable rest plate for a laptop computer is made of a thermally-conductive material;

the portable rest plate for a laptop computer comprises a slip-resistant top face for receiving the laptop computer and preventing said laptop computer from slipping onto this top face; and the bottom face of the portable rest plate for a laptop computer is formed with a heat-dissipating three-dimensional pattern that can be disposed on a user's lap when the user is in a sitting position.

Advantageously, the portable rest plate according to the illustrative embodiments of the present invention will be given, in particular but not exclusively, a size and shape suitable to accommodate several sizes and shapes of laptop computers.

First Illustrative Embodiment

The first illustrative embodiment of portable rest plate for a laptop computer according to the present invention, hereinafter referred to as the first illustrative embodiment generally identified by the reference 20 will be described in connection with FIGS. 1-3.

Figure 1:
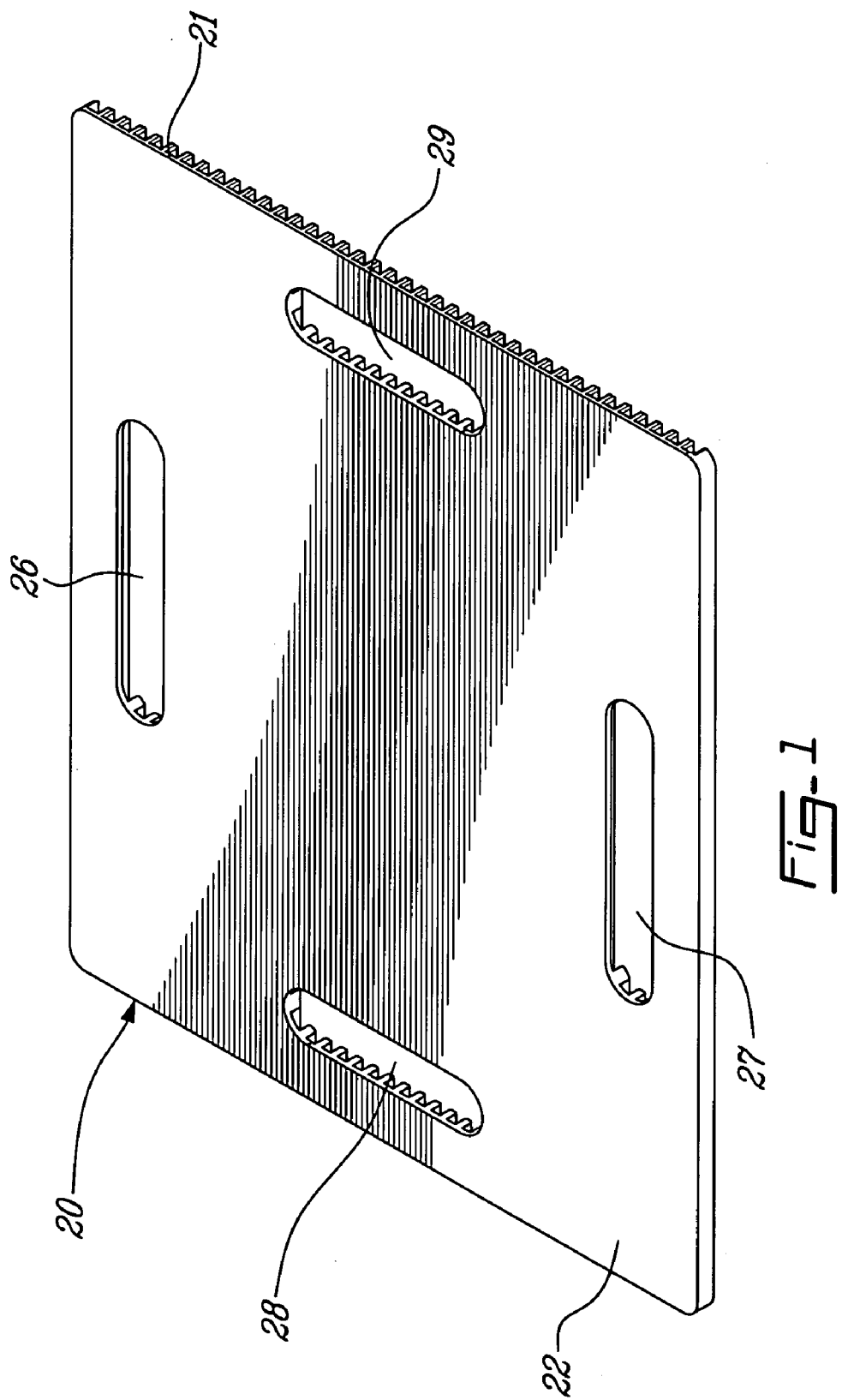
FIG. 1 is a top perspective view of a first illustrative, one-piece embodiment of portable rest plate for a laptop computer in accordance with the present invention.
Figure 2:
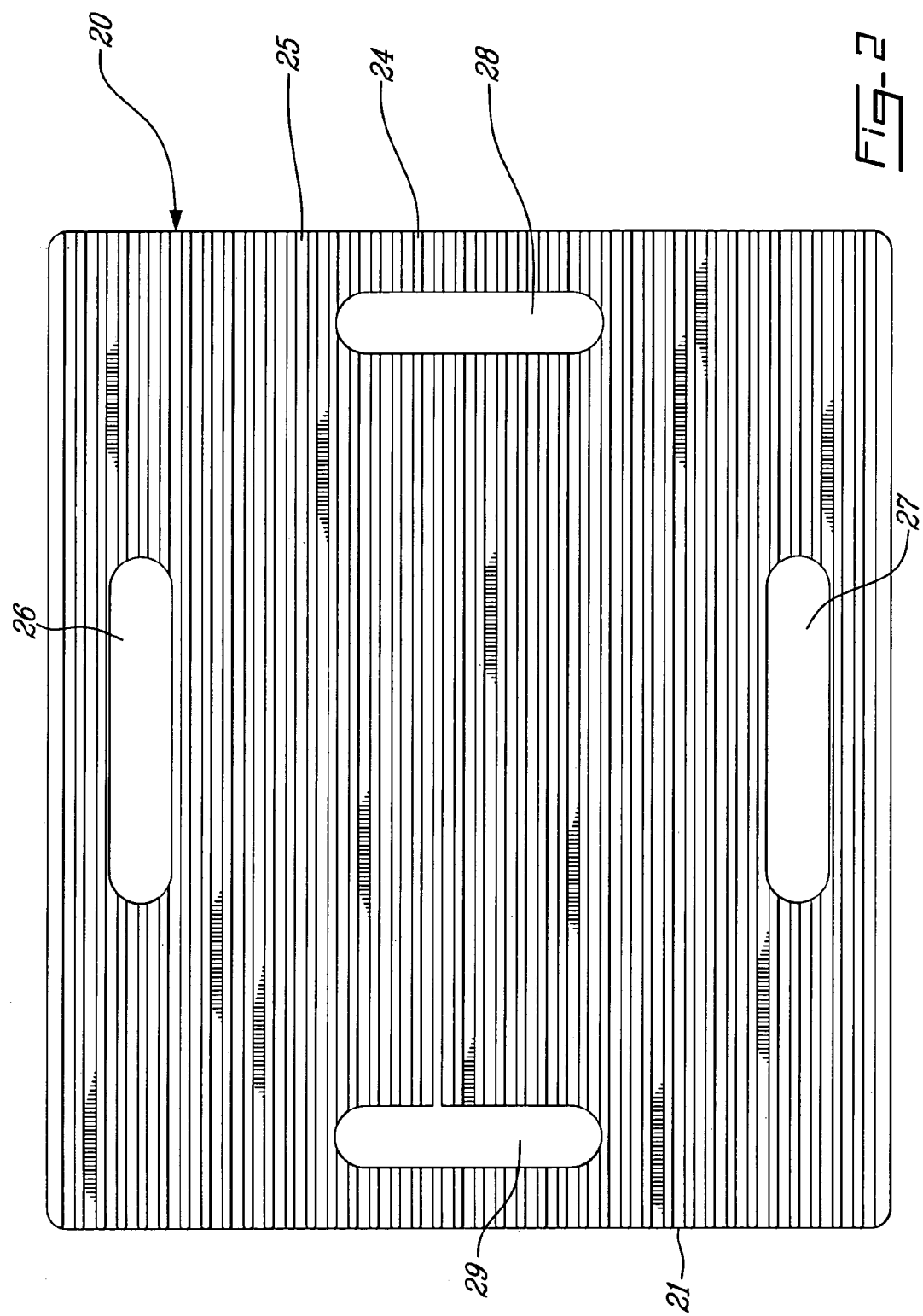
FIG. 2 is a bottom plan view of the first illustrative embodiment of portable rest plate for a laptop computer as shown in FIG. 1.
Figure 3:
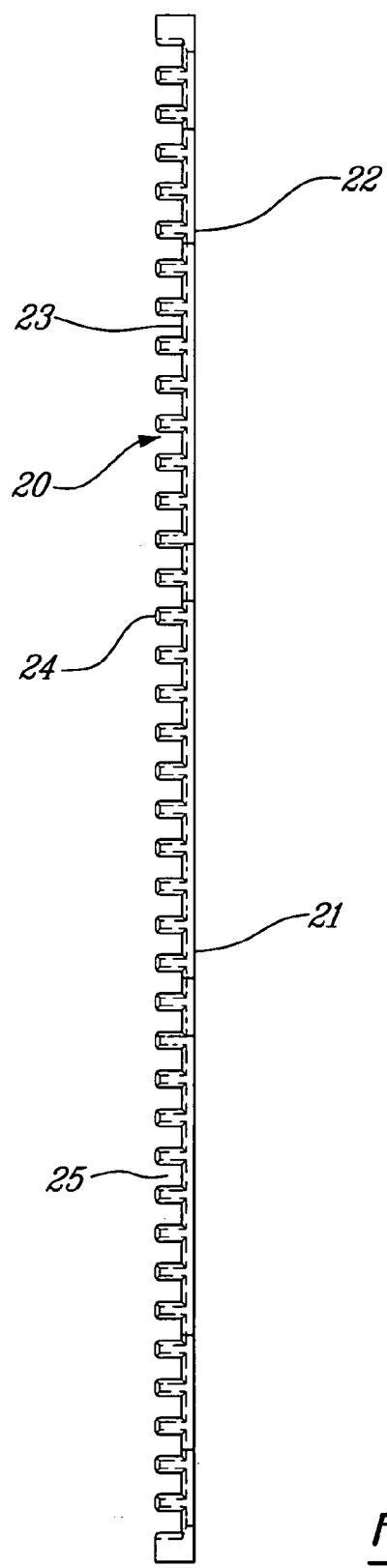
FIG. 3 is an end view of the first illustrative embodiment of portable rest plate for a laptop computer as shown in FIGS. 1 and 2.

The first illustrative embodiment 20 of FIGS. 1-3 is made of a plate 21 made of thermally-conductive material, for example aluminum having a thickness of about ¼ inch (6.3 mm). Aluminum is an adequate material due to its light weight and excellent thermal conductivity characteristics. The aluminum can be left in its natural state, or it can be painted or anodized. When appropriately dimensioned, the first illustrative embodiment 20 can be used with different sizes and shapes of laptop computers.

Referring to FIGS. 1-3, the top face 22 of the first illustrative embodiment 20 is substantially flat to receive a laptop computer. This top face 22 is advantageously at least slightly roughened, for example through sanding, to for a slip-resistant surface suitable to prevent slippage of the laptop computer onto the top face 22. The top layer 23 (FIG. 3) of the first illustrative embodiment 20 is a full-area layer that is, for example, 0.08 inch (2 mm) thick. The bottom face of the first illustrative embodiment 20 defines a heat-dissipating three-dimensional pattern comprising a set of laterally adjacent, parallel linear fins such as 24 which are, for example, 0.17 inch (4.3 mm) deep. In the first illustrative embodiment 20, each pair of adjacent fins 24 are spaced apart from each other by a generally rectangular groove such as 25, for example 0.17 inch wide. As illustrated in FIGS. 2 and 3 a regular interval separates the pairs of laterally adjacent fins 20 to form a regular pattern of laterally adjacent, longitudinally extending linear fins 24. For establishing an appropriate flow of air through the grooves 25, the pattern of fins 24 and grooves 25 extend over the entire dimension of the first illustrative embodiment 20, i.e. from one end to the other of the first illustrative embodiment 20. It should be kept in mind that it is within the scope of the present invention to provide any suitable pattern of fins on the bottom face.

A pair of opposite, longitudinal oblong holes 26 and 27 are formed through the thermally-conductive material through the entire thickness of the portable rest plated according to the first illustrative embodiment 20 adjacent the respective longitudinal opposite edges of the portable rest plate. In the same manner, a pair of opposite, transversal oblong holes 28 and 29 are formed through the thermally-conductive material of the first illustrative embodiment 20 adjacent the respective transversal opposite edges of the portable rest plate. The functions of the holes 26-29 are to facilitate handling of the first illustrative embodiment 20 along with or without the presence of a laptop computer, to reduce weight of the first illustrative embodiment 20, and to improve flow of air through the grooves such as 25 to result in a better transfer of heat from the fins 24 to this flow of air. Of course, the holes 26-29 can present shapes other than oblong.

Operation of the First Illustrative Embodiment

In operation, the laptop computer (not shown) is placed on the top face 22 of the first illustrative embodiment 20 and the fins 24 are placed on the user's lap perpendicular to the thighs of the user in a sitting (or eventually in a laying position). The roughness of the top face 22 will prevent the laptop computer from slipping onto this top face 22. Also, the above described orientation of the fins 24 and grooves 25 will prevent the first illustrative embodiment 20 from slipping along the user's thighs while allowing the user to spread apart or move his (or her) thighs toward each other.

The oblong holes 26-29 facilitate manipulation and carrying of the first illustrative embodiment 20. Also, when the laptop computer is placed on the top face 22, the oblong holes 26-29 of the first illustrative embodiment will allow the user to properly grasp the laptop computer by passing fingers though these oblong holes to thereby enable safe and easy manipulation and carrying of the assembly including the first illustrative embodiment 20 and the laptop computer positioned on the top face 22 thereof.

Since the first illustrative embodiment 20 is made of thermally conducting material, it captures part of the thermal energy generated by hot spots found on the bottom face or on the periphery of the laptop computer including ventilation ports. By thermal conduction:

the first illustrative embodiment 20 tends to evenly spread the thermal energy transferred from the laptop computer over the top face (22) area of the thermally conductive portable rest plate;

the first illustrative embodiment 20 tends to propagate the thermal energy from the top face 22 to the bottom face of the thermally conducting rest plate through an air-cooled heat exchanging pattern including the fins 24 and grooves 25, to thereby minimize the amount of thermal energy reaching the user's thighs; and the thermally conducting fins 24 are in direct contact with the user's lap and therefore capture part of the thermal energy produced by the user's thighs to propagate the so captured thermal energy by thermal conduction through the air-cooled heat-dissipating pattern including the fins 24 and the grooves 25, whereby the amount of thermal energy reaching the top face 22 of the thermally conducting rest plate is minimized.

Therefore, the grooves 25 offer a path for evacuating user's perspiration at several points to thereby improve the user's comfort. Also, the heat-dissipating portable rest plate for a laptop computer does not become uncomfortable due to excessive heat transferred to a user operating the laptop computer in a sitting position.

Second Illustrative Embodiment

The second illustrative embodiment of portable rest plate for a laptop computer according to the present invention, hereinafter referred to as the second illustrative embodiment generally identified by the reference 40 will be described with reference to FIGS. 4-7.

The second illustrative embodiment 40 of FIGS. 4-7 is made of two plate portions 41 and 42 (FIG. 4). The two plate portions 41 and 42 are made of thermally-conductive material, for example aluminum having a thickness of about ¼ inch (6.3 mm). Aluminum is an adequate material due to its light weight and excellent thermal conductivity characteristics. The aluminum can be left in its natural state, or it can be painted or anodized. When appropriately dimensioned, the first illustrative embodiment can be used with different sizes and shapes of laptop computers.

The two plate portions 41 and 42 have respective, mutually mating adjacent edges 43 and 44 (FIG. 4). Edge 43 comprises a longitudinal, elongated female-cross-section integral slide member 45 (FIG. 7). Edge 44 comprises a longitudinal, elongated male-cross-section integral slide member 46 (FIG. 7) fitting in the female-cross-section slide member 45. The male and female slide members 45 and 46 are mutually mating each other so that the male slide member 46 can be slid into the female slide member 45 for both assembling and disassembling the plate portions 41 and 42. An example of cross sections for the male 46 and female 45 slide members is given in FIG. 7; however, it should be kept in mind that the present invention is intended to encompass any suitable cross section for the slide members 45 and 46.

Referring to FIGS. 5 and 6, the top face such as 47 of each plate portion 41,42 of the second illustrative embodiment 40 is flat to receive a laptop computer. This top face 47 is advantageously at least slightly roughened, for example through sanding, to define a slip-resistant surface suitable to prevent slippage of the laptop computer onto the top face 47. The top layer such as 48 of each plate portion 41,42 of the second illustrative embodiment 40 is a full-area layer which is, for example, 0.08 inch (2 mm) thick. The bottom face of each plate portion 41, 42 of the second illustrative embodiment 40 defines a heat-dissipating three-dimensional pattern comprising a set of laterally adjacent, parallel linear fins such as 49 which are, for example, 0.17 inch (4.3 mm) deep. In the second illustrative embodiment 40, each pair of adjacent fins 49 of each plate portion 41, 42 are spaced apart from each other by a generally rectangular groove such as 50, for example 0.17 inch wide. As illustrated in FIGS. 5 and 6 a regular interval separates the pairs of laterally adjacent fins 49 to form a regular pattern of laterally adjacent, longitudinally extending linear fins 49. For establishing an appropriate flow of air through the grooves 50, the pattern of fins 49 and grooves 50 extends over the entire dimension of the portable rest plate, i.e. from one end to the other of each plate portion 41, 42 of the second illustrative embodiment 40. It should be kept in mind that it is within the scope of the present invention to provide any suitable pattern of fins on the bottom face of each plate portion 41,42.

A pair of opposite, longitudinal oblong holes 51 and 52 are formed through the respective plate portions 41 and 42 of the second illustrative embodiment 40 adjacent the respective longitudinal opposite edges of these respective plate portions 41 and 42. The functions of the oblong holes 51 and 52 are to facilitate handling of the plate portions 41 and 42 of the second illustrative embodiment 40 along with or without the presence of a laptop computer, to reduce weight of the second illustrative embodiment 40, and to improve flow of air through the grooves such as 50 (FIG. 6) to result in a better transfer of heat from the fins 49 to this flow of air. Additional holes similar to holes 28 and 29 of FIG. 1 can be made. Of course, the holes such as 51 and 52 can present any shape other than oblong.

Operation of the Second Illustrative Embodiment

The first operation consists of sliding the male slide member 46 into the female slide member 45 to thereby assemble the two plate portions 41 and 42 and thereby form the second illustrative embodiment 40. Subsequently, the male slide member 46 can be slid outside the female slide member 45 to disassemble the two plate portions 41 and 42 and thereby facilitate storage of the second illustrative embodiment 40 for example in a laptop computer carrying case (not shown).

After the two plate portions 41 and 42 have been assembled together, the laptop computer (not shown) is placed on the top faces 47 of the two plate portions 41 and 42 of the second illustrative embodiment 40 and the fins 49 of the two plate portions 41 and 42 are placed on the user's lap perpendicular to the thighs of the user in a sitting (or eventually a laying) position. The roughness of the top faces 47 will prevent the laptop computer from slipping onto the top faces 47. Also, the above described orientation of the fins 49 and grooves 50 will prevent the second illustrative embodiment 40 from slipping along the user's thighs while allowing the user to spread apart or move his (or her) thighs toward each other.

The oblong holes 51 and 52 facilitate manipulation and carrying of the two plate portions 41 and 42 of the second illustrative embodiment 40. Also, when the laptop computer is placed on the top faces 47 of the two plate portions 41 and 42, the oblong holes 51 and 52 of the second illustrative embodiment 40 will allow the user to properly grasp the laptop computer by passing fingers though these oblong holes to thereby enable safe and easy manipulation and carrying of the assembly including the second illustrative embodiment 40 and the laptop computer positioned on the top faces 47 of the two plate portions 41 and 42.

Since the two plate portions 41 and 42 of the second illustrative embodiment 40 are made of thermally-conductive material, by thermal conduction:

the two plate portions 41 and 42 of the second illustrative embodiment 40 capture part of the thermal energy generated by hot spots found on the bottom face or on the periphery of the laptop computer including ventilation ports;

the second illustrative embodiment 40 tends to evenly spread the thermal energy received from the laptop computer over the top face (47) area of the two thermally-conductive plate portions 41 and 42;

the second illustrative embodiment 40 tends to propagate the thermal energy from the top faces 47 of the two plate portions 41 and 42 to the bottom portion of these two thermally-conductive plate portions 41 and 42 through an air-cooled heat exchanging pattern including the fins 49 and grooves 50, to thereby minimize the amount of thermal energy reaching the user's legs; and the thermally conducting fins 49 are in direct contact with the user's lap and therefore capture part of the thermal energy produced by the user's thighs to propagate the so captured thermal energy by thermal conduction through the air-cooled heat-dissipating pattern including the fins 49 and the grooves 50, whereby the amount of thermal energy reaching the top faces 47 of the two plate portions 41 and 42 is minimized.

Therefore, the grooves 50 offer a path for evacuating user's perspiration at several points to thereby improve the user's comfort. Also, the heat-dissipating portable rest plate for a laptop computer does not become uncomfortable due to excessive heat transferred to a user operating the laptop computer in a sitting position.

Third Illustrative Embodiment

The third illustrative embodiment of portable rest plate for laptop computer according to the present invention, hereinafter referred to as the third illustrative embodiment generally identified by the reference 60 will be described with reference to FIGS. 8-11.

The third illustrative embodiment 60 of FIGS. 8-11 can be folded and comprises, for that purpose, two plate portions 61 and 62 hinged to each other. The two plate portions 61 and 62 are made of thermally-conductive material, for example aluminum having a thickness of about ¼ inch (6.3 mm). Aluminum is an adequate material due to both its lightweight and excellent thermal conductivity characteristics. The aluminum can be left in its natural state, or it can be painted or anodized. When the plate portions 61 and 62 are appropriately dimensioned, the third illustrative embodiment can be used with different sizes and shapes of laptop computers.

Figure 8:
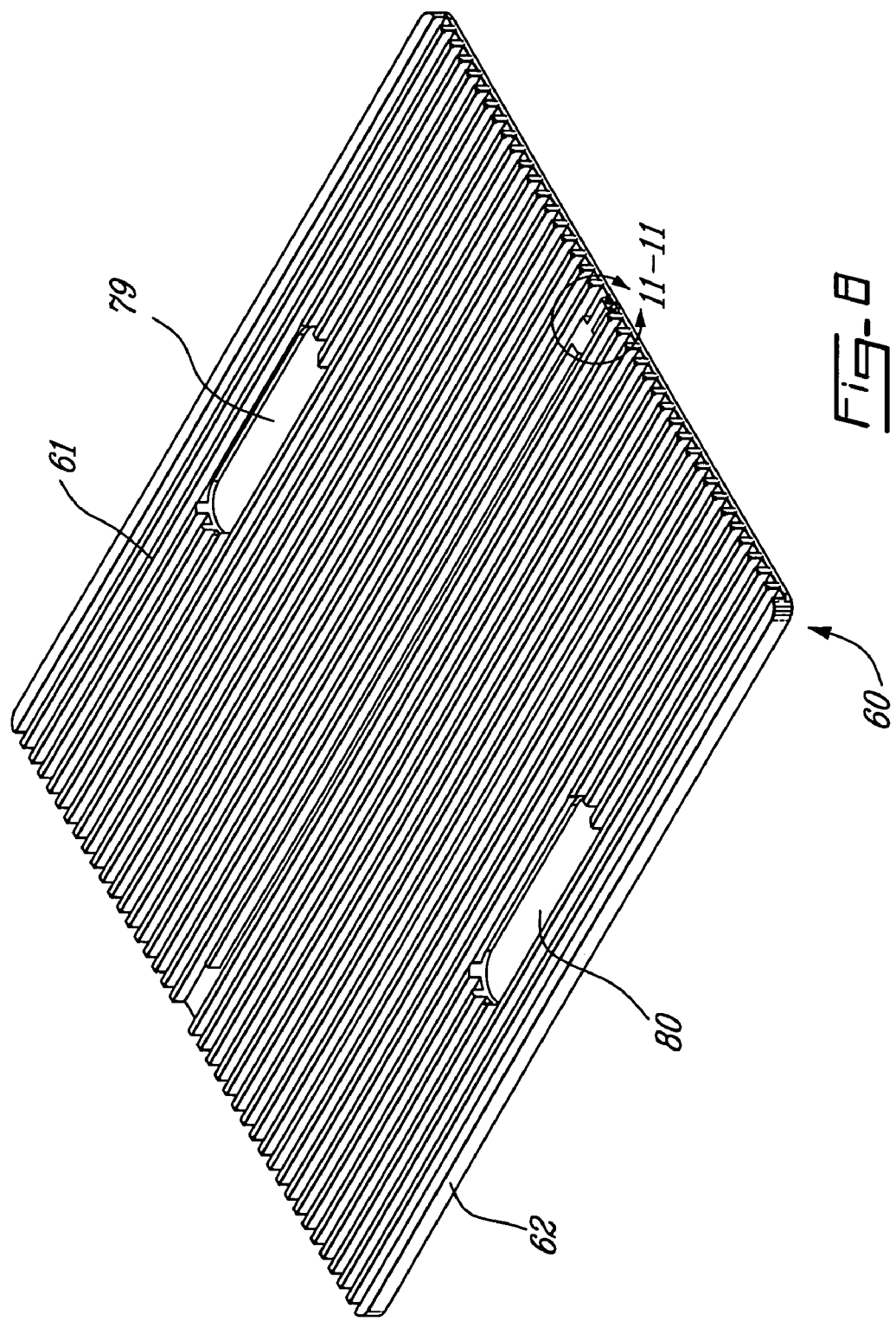
FIG. 8 is a bottom perspective view of a third illustrative embodiment of portable rest plate for a laptop computer in accordance with the present invention, which is foldable to facilitate storage thereof in, for example, a laptop computer carrying case.
Figure 9:
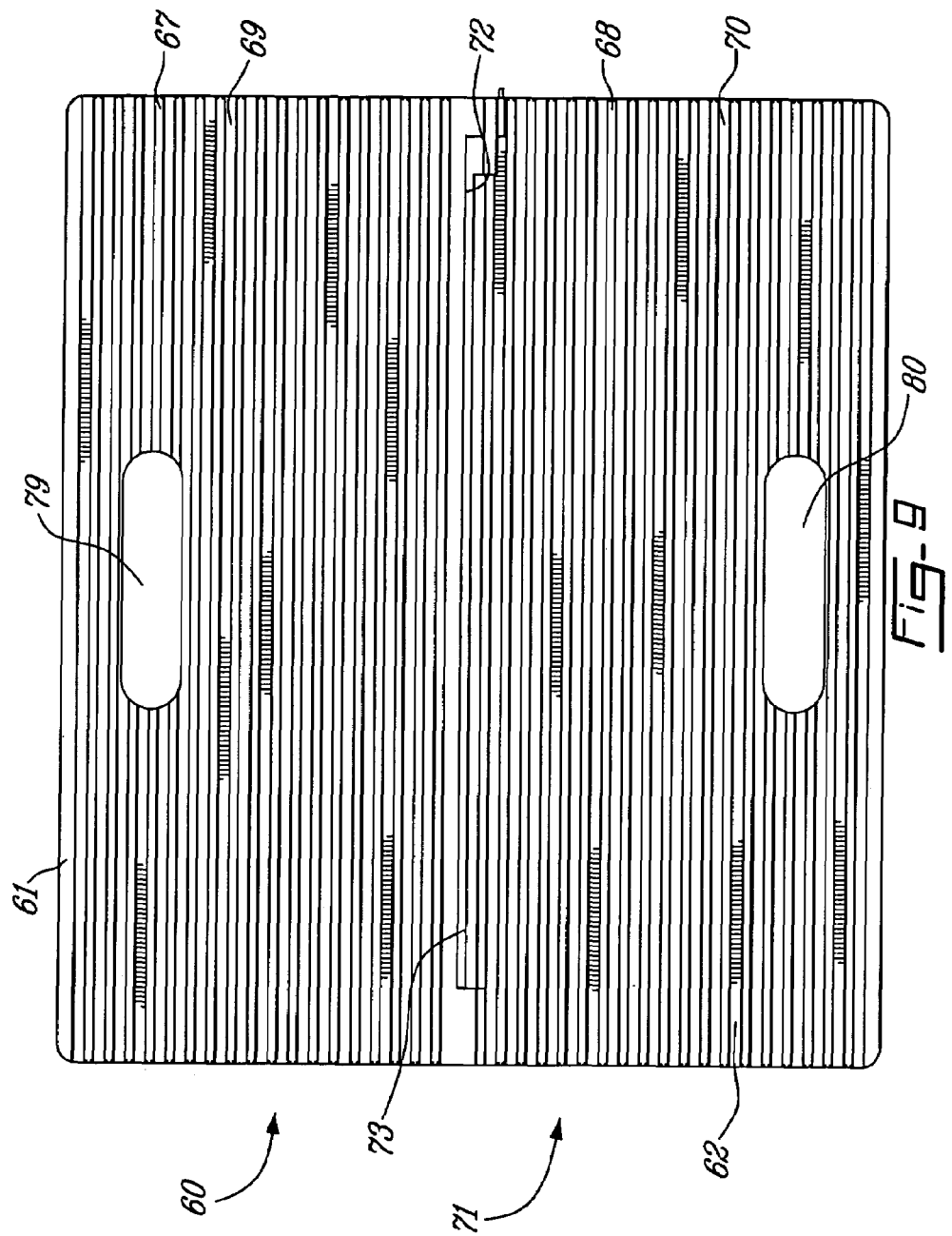
FIG. 9 is a bottom plan view of the third illustrative embodiment of portable rest plate for a laptop computer as shown in FIG. 8.
Figure 10:
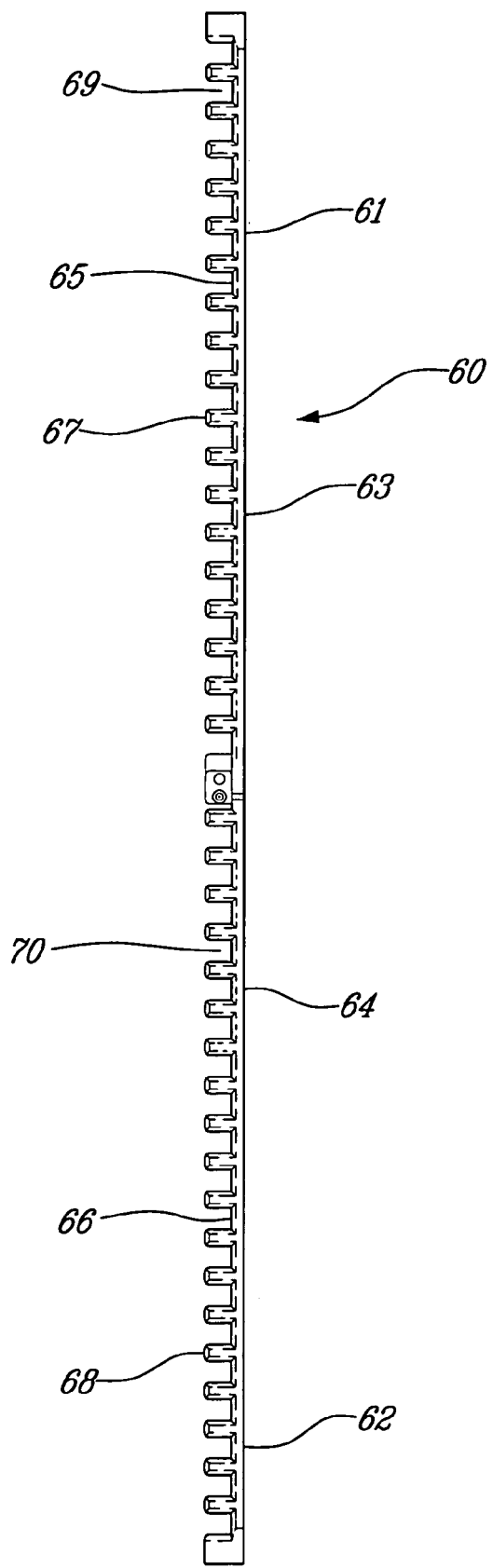
FIG. 10 is an end view of the third illustrative embodiment of portable rest plate for a laptop computer as shown in FIGS. 8 and 9.

Referring to FIG. 10, the top face 63 of plate portion 61 and the top face 64 of plate portion 62 of the third illustrative embodiment 60 are substantially flat to receive a laptop computer (not shown). These top faces 63 and 64 are advantageously at least slightly roughened, for example through sanding, to form a slip-resistant surface suitable to prevent slippage of the laptop computer onto these top faces 63 and 64. Plate portion 61 comprises a full-area top layer 65 and plate portion 62 of the third illustrative embodiment comprises a full-area top layer 66. As an example, the full-area top layers 65 and 66 are 0.08 inch (2 mm) thick. The plate portion 61 of the third illustrative embodiment 60 comprises a bottom face defining a heat-dissipating three-dimensional pattern comprising a set of laterally adjacent, parallel linear fins such as 67. In the same manner, the plate portion 62 of the third illustrative embodiment 60 comprises a bottom face defining a heat-dissipating three-dimensional pattern comprising a set of laterally adjacent, parallel linear fins such as 68. For example, the fins 67 and 68 are 0.17 inch (4.3 mm) deep. In the third illustrative embodiment 60, each pair of adjacent fins 67 and 68 of the respective plate portions 61 and 62 are spaced apart from each other by a generally rectangular groove such as 69 and 70, respectively. For example, the rectangular grooves 69 and 70 are 0.17 inch wide. As illustrated in FIGS. 8-10, a regular interval separates the pairs of laterally adjacent fins 67 and 68 to form a regular pattern of laterally adjacent, longitudinally extending linear fins 67 and 68. For establishing an appropriate flow of air through the grooves 69 and 70, the pattern of fins 67 and 68 extends over the entire dimension of the portable rest plate, i.e. from one end to the other of the plate portions 61 and 62, respectively. It should be kept in mind that it is within the scope of the present invention to provide any suitable pattern of fins 67 and 68 on the bottom face of the plate portions 61 and 62.

Figure 11:
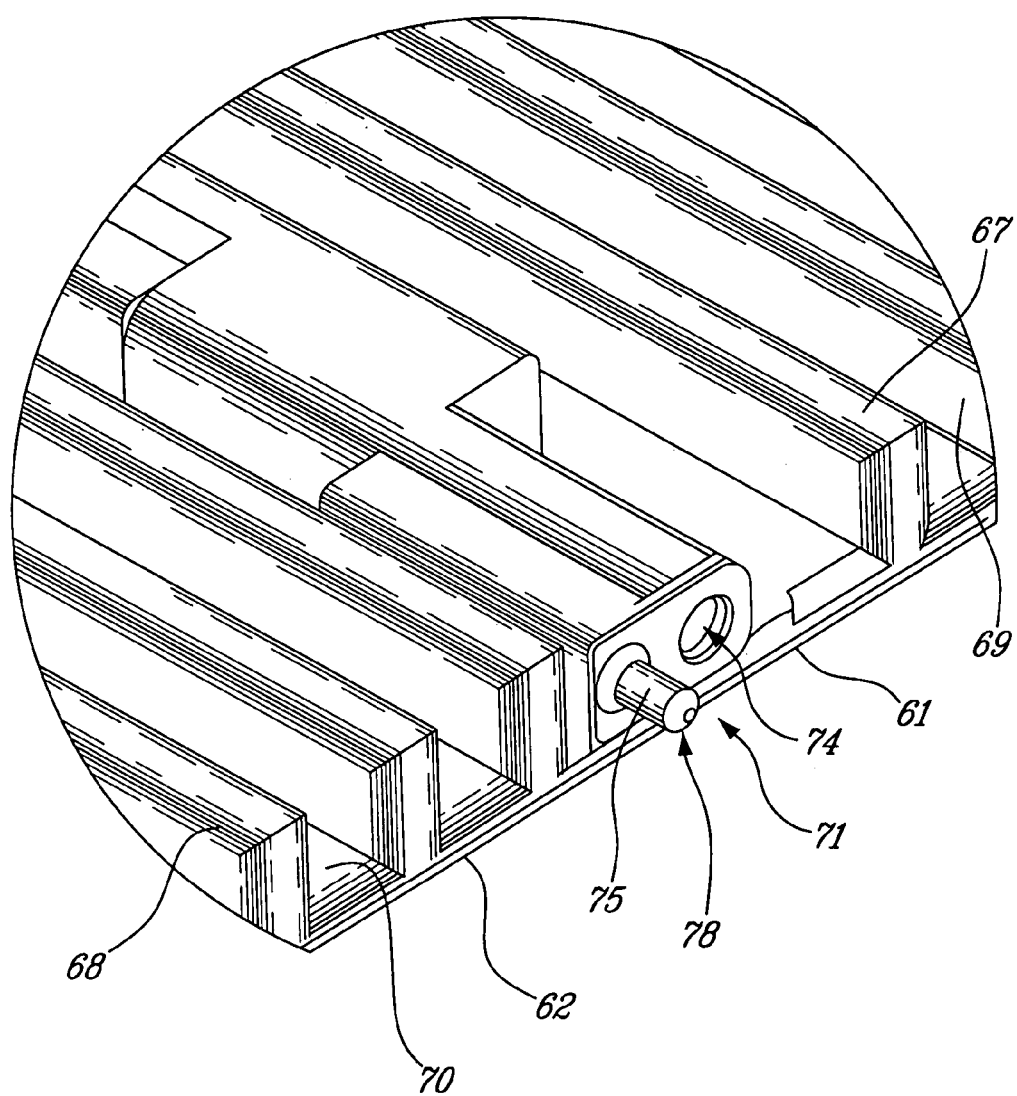
FIG. 11 is an enlarged, bottom perspective view of a hinge mechanism for folding the third illustrative embodiment of portable rest plate for a laptop computer as shown in FIGS. 8-10.

The plate portions 61 and 62 are connected to each other through a hinge 71 (FIGS. 9 and 11). For that purpose, the third illustrative embodiment 60 comprises mutually mating notched edge 72 of the plate portion 61 and crenelated edge 73 of the plate portion 62. The hinge 71 comprises a pivot pin 74 extending longitudinally through the notched 72 and crenelated 73 edges, and about which both the notched edge 72 and crenelated edge 73 rotate. When the third illustrative embodiment 60 is folded, the fins 67 of plate portion 61 are inserted in the rectangular grooves of plate section 62, and the fins 68 of plate portion 62 are inserted in the rectangular grooves 69 of plate portion 61. A locking mechanism 78 (FIG. 11) is provided to lock the plate portions 61 and 62 in the unfolded position of the third illustrative embodiment 60; this locking mechanism 78 may consist, for example, of a spring-biased pin 75 mounted on the notched end 72 and having one end (not shown) that is automatically inserted by the force produced by the spring (not shown) into a corresponding hole (not shown) of the crenelated edge 73 as soon as the pin and hole becomes in registry upon unfolding of the third illustrative embodiment 60. The present invention is intended to encompass the use of any other type of suitable locking mechanism. Locking the plate portions 61 and 62 in the unfolded position of the third illustrative embodiment 60 is required to ensure proper and safe use of this third illustrative embodiment 60. To subsequently fold the third illustrative embodiment 60, the pin 75 is manually pulled or pushed against the force produced by the spring until the end of the pin is withdrawn from the hole of the crenelated edge, and the plate portions 61 and 62 are pivoted about the pivot pin 74 until the fins 67 and 68 are inserted in the rectangular grooves 70 and 69, respectively. In the folded position, the third illustrative embodiment 60 can be more easily stored and carried for example in a laptop computer carrying case.

A pair of opposite, longitudinal oblong holes 79 and 80 (FIGS. 8 and 9) are formed through the respective plate portions 61 and 62 of the third illustrative embodiment 60 adjacent the respective longitudinal opposite edges of these respective plate portions 61 and 62. The functions of the oblong holes 79 and 80 are to facilitate handling of the plate portions 61 and 62 of the third illustrative embodiment 60 along with or without the presence of a laptop computer, to reduce weight of the third illustrative embodiment 60, and to improve flow of air through the grooves 69 and 70 (FIGS. 9 and 10) to result in a better transfer of heat from the fins 67 and 68 to the flow of air. Those of ordinary skill in the art will note that, when the third illustrative embodiment 60 is in the folded position, the oblong holes 79 and 80 are in register with each other. Additional holes similar to holes 28 and 29 of FIG. 1 can be made. Of course, the holes such as 79 and 80 can present a shape other than oblong.

Operation of the Third Illustrative Embodiment

The first operation consists of unfolding the third illustrative embodiment 60 by rotating the plate portions 61 and 62 apart from each other until the spring-biased pin 75 of the locking mechanism 78 automatically inserts into the hole of the crenelated edge 73 to thereby lock the plate portions 61 and 62 in the unfolded position of the third illustrative embodiment 60. The third illustrative embodiment 60 can be subsequently unfolded by manually pulling or pushing the pin 75 against the force produced by the spring until the end of the pin is withdrawn from the hole of the crenelated edge 73 and, then, by pivoting the plate portions 61 and 62 pivoted about the pivot pin 74 until the fins 67 and 68 are inserted in the rectangular grooves 70 and 69, respectively. In the folded position, the third illustrative embodiment 60 can be more easily stored and carried for example in a laptop computer carrying case.

After the third illustrative embodiment 60 has been unfolded, the laptop computer (not shown) is placed on the top faces 63 and 64 of the two plate portions 61 and 62 and the fins 67 and 68 of the two plate portions 61 and 62 are placed on the user's lap perpendicular to the thighs of the user in a sitting (or eventually a laying) position. The roughness of the top faces 63 and 64 will prevent the laptop computer from slipping onto the top faces 63 and 64. Also, the above described orientation of the fins 67 and 68 and grooves 69 and 70 will prevent the third illustrative embodiment 60 from slipping along the user's thighs while allowing the user to spread apart or move his (or her) legs toward each other.

The oblong holes 79 and 80 facilitate manipulation and carrying of the third illustrative embodiment 60. Also, when the laptop computer is placed on the top faces 63 and 64 of the two plate portions 61 and 62, the oblong holes 79 and 80 of the third illustrative embodiment will allow the user to properly grasp the laptop computer by passing fingers though these oblong holes to thereby enable safe and easy manipulation and carrying of the assembly including the third illustrative embodiment 60 and the laptop computer positioned on the top face 63 and 64 of the plate portions 61 and 62.

Since the two plate portions 61 and 62 of the third illustrative embodiment 60 are made of thermally conducting material, by thermal conduction:

the two plate portions 61 and 62 of the third illustrative embodiment capture part of the thermal energy generated by hot spots found on the bottom face or on the periphery of the laptop computer including ventilation ports;

the third illustrative embodiment 60 tends to evenly spread the thermal energy received from the laptop computer over the top face (63 and 64) area of the two thermally conductive plate portions 61 and 62;

the third illustrative embodiment 60 tends to propagate the thermal energy from the top faces 63 and 64 of the two plate portions 61 and 62 to the bottom layer of these two thermally conducting plate portions 61 and 62 through an air-cooled heat exchanging structure including the fins 67 and 68 and the rectangular grooves 69 and 70, to thereby minimize the amount of thermal energy reaching the user's legs; and the thermally conducting fins 67 and 68 are in direct contact with the user's legs and therefore capture part of the thermal energy produced by the user's legs to propagate the so captured thermal energy by thermal conduction through the air-cooled heat-dissipating structure including the fins 67 and 68 and the rectangular grooves 69 and 70, whereby the amount of thermal energy reaching the top faces 63 and 64 of the two plate portions 61 and 62 is minimized.

Therefore, the rectangular grooves 69 and 70 offer a path for evacuating user's perspiration at several points to thereby improve the user's comfort. Also, the heat-dissipating portable rest plate for a laptop computer does not become uncomfortable due to excessive heat transferred to a user operating the laptop computer in a sitting position.

The portable rest plate according to the present invention further comprise the advantage of extending the lifetime of the laptop computer since the portable rest plate captures part of the thermal energy generated by hot spots found on the bottom surface or on the periphery of said laptop computer, including ventilation ports.

The portable rest plate can also be integrated to the laptop computer with substantially the same advantages.

Although the present invention has been described hereinabove with reference to illustrative embodiments thereof, these embodiments can be modified at will, within the scope of the appended claims, without departing from the spirit and nature of the present invention.

What is claimed is:

1. A portable rest device for a laptop computer made of thermally-conductive material, and comprising:
   a top face for receiving the laptop computer;
   a bottom face for being placed on the lap of a user, said bottom face comprising a heat-dissipating structure, comprising a set of elongated adjacent grooves each said groove defining an air path spanning from one side edge of said bottom face to another; and
   wherein, when said bottom face is disposed on the lap of the user and the laptop computer is disposed on said top face, each said air path is so configured as to provide for evacuating thermal energy produced by the lap of the user from said bottom face side edges thereby reducing the thermal energy reaching said top face.

2. A portable rest device for a laptop computer as defined in claim 1, wherein said top face is substantially flat.

3. A portable rest device for a laptop computer as defined in claim 1, wherein said top face defines a slip-resistant surface to prevent the laptop computer from slipping onto said top face.

4. A portable rest device for a laptop computer as defined in claim 1, wherein said bottom heat-dissipating structure comprises a plurality of heat-dissipating fins.

5. A portable rest device for a laptop computer as defined in claim 1, wherein said bottom heat-dissipating structure comprises a set of heat-dissipating fins, said heat-dissipating fins being laterally adjacent to each other, and each pair of said laterally adjacent heat-dissipating fins being separated from each other by a said groove.

6. A portable rest device for a laptop computer as defined in claim 5, wherein said fins and said grooves are linear and extend over the entire dimension of said portable rest device.

7. A portable rest device for a laptop computer as defined in claim 5, wherein said heat-dissipating fins are elongated and linear, at a substantially right angle with respect to the lap of the user when said bottom heat-dissipating structure is disposed thereon.

8. A portable rest device for a laptop computer as defined in claim 7, comprising two plate portions, and a hinge mechanism interconnecting said two plate portions for folding and unfolding said portable rest device in such a manner that, when said portable rest device is folded, said fins of each said plate portion are inserted in said grooves of said other plate portion, wherein folding of said two plate portions reduces bulkiness of said portable rest plate device to facilitate storage thereof.

9. A portable rest device for a laptop computer as defined in claim 5, wherein said heat-dissipating fins and said grooves are linear and extend over the whole dimension of the portable rest device to improve flow of air through said grooves and transfer of heat from said fins to the flow of air within said grooves.

10. A portable rest device for a laptop computer as defined in claim 1, comprising holes made in said thermally-conductive material through the entire thickness of said portable rest device.

11. A portable rest device for a laptop computer as defined in claim 1, wherein said portable rest device is made of a single piece of said thermally-conductive material.

12. A portable rest device for a laptop computer as defined in claim 1, comprising two plate portions having respective mutually mating adjacent edges.

13. A portable rest device for a laptop computer as defined in claim 12, wherein said respective adjacent edges of said two plate portions comprise respective, mutually mating integral slide members that are slid in each other both to assemble said two plate portions with each other and to disassemble said two plate portions from each other.

14. A portable rest device for a laptop computer as defined in claim 1, comprising two plate portions, and a hinge mechanism interconnecting said two plate portions for folding and unfolding said portable rest device, folding of said portable rest device reducing bulkiness of said portable rest device to facilitate storage thereof.

15. A portable rest device for a laptop computer as defined in claim 14, further comprising a lock mechanism interposed between said two plate portions for locking said two plate portions relative to each other in said unfolded position of said portable rest device to thereby enable use of said portable rest device.

* * * * *